US012233441B2

(12) United States Patent
Wu et al.

(10) Patent No.: US 12,233,441 B2
(45) Date of Patent: Feb. 25, 2025

(54) ULTRAVIOLET AND OZONE CLEANING APPARATUS AND METHOD OF USING

(71) Applicant: Applied Materials, Inc., Santa Clara, CA (US)

(72) Inventors: Banqiu Wu, San Jose, CA (US); Khalid Makhamreh, Los Gatos, CA (US); Eliyahu Shlomo Dagan, Sunnyvale, CA (US)

(73) Assignee: APPLIED MATERIALS, INC., Santa Clara, CA (US)

(*) Notice: Subject to any disclaimer, the term of this patent is extended or adjusted under 35 U.S.C. 154(b) by 17 days.

(21) Appl. No.: 17/987,591

(22) Filed: Nov. 15, 2022

(65) Prior Publication Data

US 2024/0157411 A1 May 16, 2024

(51) Int. Cl.

| | |
|---|---|
| ***B08B 13/00*** | (2006.01) |
| ***B08B 3/08*** | (2006.01) |
| ***B08B 3/10*** | (2006.01) |
| ***B08B 7/00*** | (2006.01) |
| ***B08B 7/04*** | (2006.01) |

(52) U.S. Cl.

CPC .................. *B08B 7/04* (2013.01); *B08B 3/08* (2013.01); *B08B 3/10* (2013.01); *B08B 7/0057* (2013.01); *B08B 13/00* (2013.01); *B08B 2203/005* (2013.01)

(58) Field of Classification Search

None

See application file for complete search history.

(56) References Cited

U.S. PATENT DOCUMENTS

| | | | |
|---|---|---|---|
| 7,935,940 | B1 | 5/2011 | Smargiassi |
| 2002/0024278 | A1 | 2/2002 | Matsuda et al. |
| 2007/0295012 | A1 | 12/2007 | Ho et al. |

FOREIGN PATENT DOCUMENTS

| | | | | |
|---|---|---|---|---|
| JP | 2002-134401 A | | 5/2002 | |
| JP | 2015-153927 A | | 8/2015 | |
| KR | 10-1998-0015254 A | | 5/1998 | |
| WO | WO-2020099385 A1 | * | 5/2020 | ............... B05D 1/60 |

OTHER PUBLICATIONS

JP 2015153927 translation (Year: 2024).*

International Search Report for PCT/US2023/037278, dated Mar. 19, 2024.

* cited by examiner

*Primary Examiner* — Eric W Golightly

(74) *Attorney, Agent, or Firm* — Moser Taboa

(57) ABSTRACT

A cleaning apparatus for cleaning a substrate wherein the substrate is contacted with ozonated water and irradiating the substrate and the ozonated water with UV electromagnetic radiation from a UV lamp within a cleaning chamber; wherein greater than or equal to about 50% of the UV electromagnetic radiation has a wavelength of greater than or equal to about 280 nm. Methods of cleaning a substrate are also presented.

8 Claims, 3 Drawing Sheets

ULTRAVIOLET AND OZONE CLEANING APPARATUS AND METHOD OF USING

FIELD

Embodiments of the present disclosure generally relate to a cleaning system, and, more specifically, to an ultraviolet and ozone cleaning system.

BACKGROUND

Substrates for use in the semiconductor manufacturing industry are often cleaned to remove unwanted materials such as contaminants or other unwanted particles generated thereon during processing. Substrates may include semiconductor wafers, chamber components, photomasks, or the like.

Contaminants can be removed by washing the substrate with ultraviolet-irradiated ozonated water. Such water can be irradiated by an ultraviolet radiation source that emits ultraviolet radiation. However, the inventors have observed that some ultraviolet ozonated water cleaning devices and methods undesirably contribute to removing or altering additional materials besides the contaminants to be cleaned. The additional material removal or alteration may cause defects to the substrate.

Accordingly, the inventors have provided improved cleaning apparatuses and methods for cleaning substrates.

SUMMARY

Embodiments of apparatuses and methods for cleaning a substrate are provided herein. In some embodiments, a method of cleaning a substrate includes contacting the substrate with ozonated water and irradiating the substrate and the ozonated water with UV electromagnetic radiation from a UV lamp within a cleaning chamber, wherein greater than or equal to about 50% of the UV electromagnetic radiation has a wavelength of greater than or equal to about 280 nm.

In some embodiments, a method of cleaning a substrate includes contacting the substrate with ozonated water and irradiating the substrate and the ozonated water with UV electromagnetic radiation from a low-pressure mercury UV lamp within a cleaning chamber, the cleaning chamber further comprising a thermocouple configured to determine a temperature of the UV lamp; and a UV detector, and the UV lamp being disposed in thermal communication with a controlled flow of a cooling fluid, wherein the flow of the cooling fluid is controlled such that greater than or equal to about 50% of the UV electromagnetic radiation has a wavelength of greater than or equal to about 280 nm, based at least in part on a temperature of the low-pressure mercury UV lamp, and a signal produced by the UV detector.

In embodiments, a cleaning apparatus for cleaning a substrate comprises a UV lamp assembly comprising a UV lamp, disposed over a substrate support disposed within a cleaning chamber, wherein the UV lamp assembly is configured such that, in operation, greater than or equal to about 50% of the UV electromagnetic radiation emitted by the UV lamp assembly has a wavelength of greater than or equal to about 280 nm, a water inlet for receiving a supply of ozonated water and a water outlet disposed above the substrate support for discharging ozonated water irradiated by the UV lamp assembly into contact with the substrate disposed on the substrate support, wherein UV electromagnetic radiation emitted by the UV lamp assembly contacts the ozonated water and the substrate within the cleaning chamber.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1:
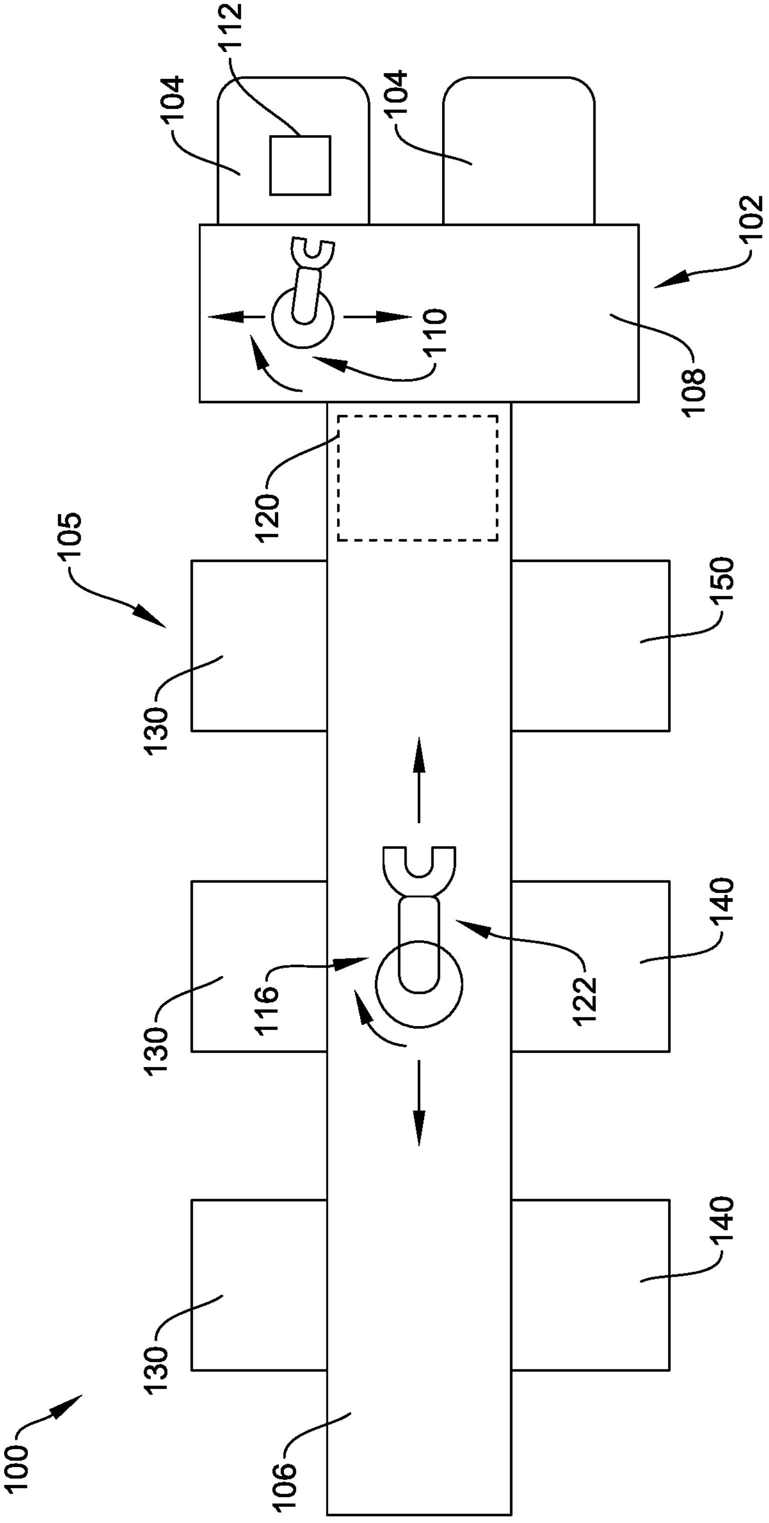
FIG. 1 depicts a schematic view of a multi-chamber processing tool having a cleaning chamber in accordance with at least some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

For purposes herein, the terms UV electromagnetic radiation and UV light are used interchangeably, and refer to electromagnetic radiation having a wavelength from about 200 nm to about 400 nm.

Embodiments of cleaning chambers for cleaning substrates are provided herein. The cleaning chambers are configured to clean the substrates to remove unwanted particles or residue after the substrates undergo a wet clean process. The substrates may be, for example, semiconductor wafers, photomasks, or the like. In the example of the photomasks, photoresist may be left on the substrate. Flowing ultraviolet-irradiated ozonated water over the photoresist causes the photoresist to dissociate from the photomask. The dissociated residue and water may then be removed from an interior volume of the cleaning chamber.

In embodiments, a method of cleaning a substrate, comprises contacting the substrate with ozonated water and irradiating the substrate and the ozonated water with UV electromagnetic radiation from a UV lamp within a cleaning chamber; wherein greater than or equal to about 50% of the UV electromagnetic radiation has a wavelength of greater than or equal to about 280 nm.

In some of such embodiments, at least a portion of the ozonated water is irradiated with the UV electromagnetic radiation prior to the ozonated water contacting the substrate.

In embodiments, the UV lamp is disposed in thermal communication with a controlled flow of a cooling fluid, and wherein the method further comprises controlling a flow of the cooling fluid such that greater than or equal to about 50% of the UV electromagnetic radiation emitted by the UV lamp has a wavelength of greater than or equal to about 280 nm. In some of such embodiments, the cleaning chamber further comprises a thermocouple configured to determine a temperature of the UV lamp; and wherein the method further comprises controlling the flow of the cooling fluid based at least in part on a temperature of the UV lamp. In some embodiments, the cleaning chamber further comprises a UV detector, and wherein the method further comprises controlling the flow of the cooling fluid based at least in part on a signal produced by the UV detector. In embodiments, the cooling fluid is in physical contact with at least a portion of the UV lamp.

In embodiments, the UV lamp is configured such that when a temperature of the UV lamp is within a first temperature range, greater than or equal to about 50% of the UV electromagnetic radiation emitted by the UV lamp is less than or equal to 270 nm; and when the temperature of the UV lamp is within an operational temperature range, greater than or equal to about 50% of the UV electromagnetic radiation emitted by the UV lamp is greater than or equal to 280 nm; wherein a lower limit of the operational temperature range is greater than an upper limit of the first temperature range.

In embodiments, the UV lamp comprises a coating configured to produce a bathochromic shift in a wavelength of UV electromagnetic radiation. In some embodiments, greater than or equal to about 50% of the UV electromagnetic radiation emitted by the lamp assembly has a wavelength from greater than or equal to about 310 nm and less than or equal to about 370 nm. In some embodiments, greater than or equal to about 50% of the UV electromagnetic has a wavelength greater than or equal to about 310 nm and less than or equal to about 320 nm. In some embodiments, greater than or equal to about 50% of the UV electromagnetic radiation has a wavelength greater than or equal to about 365 nm and less than or equal to about 375 nm.

In an embodiment, a method of cleaning a substrate, comprises contacting the substrate with ozonated water and irradiating the substrate and the ozonated water with UV electromagnetic radiation from a low-pressure mercury UV lamp within a cleaning chamber; the cleaning chamber further comprising a thermocouple configured to determine a temperature of the UV lamp; and a UV detector, and the UV lamp being disposed in thermal communication with a controlled flow of a cooling fluid; wherein the flow of the cooling fluid is controlled such that greater than or equal to about 50% of the UV electromagnetic radiation has a wavelength of greater than or equal to about 280 nm, based at least in part on a temperature of the low-pressure mercury UV lamp, and a signal produced by the UV detector.

In some of such embodiments, a cleaning apparatus comprises a UV lamp assembly comprising a UV lamp, disposed over a substrate support disposed within a cleaning chamber, wherein the UV lamp assembly is configured such that, in operation, greater than or equal to about 50% of the UV electromagnetic radiation emitted by the UV lamp assembly has a wavelength of greater than or equal to about 280 nm; a water inlet for receiving a supply of ozonated water and a water outlet disposed above the substrate support for discharging ozonated water irradiated by the UV lamp assembly into contact with the substrate disposed on the substrate support; wherein UV electromagnetic radiation emitted by the UV lamp assembly contacts the ozonated water and the substrate within the cleaning chamber.

In some embodiments, the cleaning apparatus comprises a coating disposed on the UV lamp, configured to produce a bathochromic shift in a wavelength of UV electromagnetic radiation, configured to remove UV electromagnetic radiation having a wavelength below 280 nm; or a combination thereof.

In some embodiments, the cleaning apparatus comprises an optical filter configured to produce a bathochromic shift in a wavelength of UV electromagnetic radiation, configured to remove UV electromagnetic radiation having a wavelength below 280 nm; or a combination thereof.

In some embodiments, the cleaning apparatus comprises a UV detector and a UV lamp in thermal communication with a controlled flow of a cooling fluid; configured such that, in operation, the flow of the cooling fluid is controlled based at least in part on a response of the UV detector.

In some embodiments, the apparatus comprises a thermocouple configured to determine a temperature of the UV lamp; configured such that, in operation, the flow of the cooling fluid is controlled based at least in part on a response of the thermocouple, e.g., the temperature of the UV lamp.

In embodiments, the UV lamp of the cleaning apparatus is a low-pressure mercury UV lamp.

FIG. 1 depicts a schematic view of a multi-chamber processing tool 100 having one or more cleaning chambers 130 (three shown in FIG. 1) in accordance with at least some embodiments of the present disclosure. The below-described multi-chamber processing tool 100 is shown in an exemplary configuration and other configurations can be utilized as well. The multi-chamber processing tool 100 generally includes a factory interface 102, a transfer chamber 106 coupled to the factory interface 102, and a plurality of process chambers 105, including the cleaning chambers 130 coupled to the transfer chamber 106. The factory interface 102 includes a plurality of loadports 104 for receiving one or more substrates 112. The one or more substrates 112 may be semiconductor wafers, carrier substrates, photomasks, or the like. In some embodiments, the plurality of loadports 104 are arranged along a common side of the factory interface 102. A factory interface robot 110 may be disposed in an interior volume 108 of the factory interface 102 to shuttle or transport the one or more substrates 112 from the plurality of loadports 104 to the transfer chamber 106. The factory interface robot 110 may be configured for rotational movement within the interior volume 108, lateral movement within the interior volume 108, or both.

The transfer chamber 106 is coupled to the factory interface 102, and in some embodiments, is disposed on a side of the factory interface 102 opposite the plurality of loadports 104. The transfer chamber 106 includes a transfer robot 116 disposed therein for shuttling the one or more substrates 112 received from the factory interface robot 110 to the one or more process chambers 105 coupled to the transfer chamber. The transfer robot 116 may be configured for rotational movement, lateral movement, or both. For example, lateral movement may be achieved via rails on a floor of the transfer chamber 106 or via wheels or tracks under the transfer robot 116. An arm 122 of the transfer robot 116 may expand and contract to move the one or more substrates 112 into and out of respective chambers of the plurality of process chambers 105.

In some embodiments, the transfer robot 116 is configured to directly receive the one or more substrates 112 from the factory interface robot 110. In some embodiments, the transfer robot 116 is configured to indirectly receive the one or more substrates 112 from the factory interface robot 110. For example, in some embodiments, one of the factory interface 102 or the transfer chamber 106 includes a buffer 120 configured to hold one or more of the one or more substrates 112. The transfer robot 116 may be configured to transfer the one or more substrates 112 to the buffer 120 and the transfer robot 116 may be configured to transfer the one or more substrates 112 from the buffer 120 to the plurality of process chambers 105 and from the plurality of process chambers 105 back to the buffer 120.

The transfer chamber 106 may have one or more environmental controls. For example, an airflow opening in the transfer chamber 106 may include a filter to filter the airflow entering the transfer chamber 106. Other environmental controls may include one or more of humidity control, static control, temperature control, or pressure control.

The one or more process chambers 105 may be coupled orthogonally to the transfer chamber 106 or may be coupled at an angle with respect to the transfer chamber 106. The plurality of process chambers 105 may be sealingly engaged with the transfer chamber 106. The transfer chamber 106 generally operates at atmospheric pressure but may be configured to operate at vacuum pressure. The plurality of process chambers 105 are configured to perform one or more processing steps to one or more substrates 112 being processed in the multi-chamber processing tool 100. For example, the plurality of process chambers 105 may comprise one or more cleaning chambers 130 (three shown in FIG. 1) configured to clean the one or more substrates 112 with a liquid, for example, water. The plurality of process chambers 105 may comprise one or more dry clean chambers 140 (two shown in FIG. 1) configured to perform a dry clean process on the one or more substrates 112, for example, via a plasma etch or plasma ashing procedure. The one or more process chambers 105 includes at least one baking chamber, for example, the baking chamber 150 configured to heat the one or more substrates to remove residue or haze left over after the wet clean or dry clean process. In some embodiments, the one or more cleaning chambers 130 are disposed on a side of the transfer chamber 106 different than the one or more dry clean chambers 140.

Figure 2:
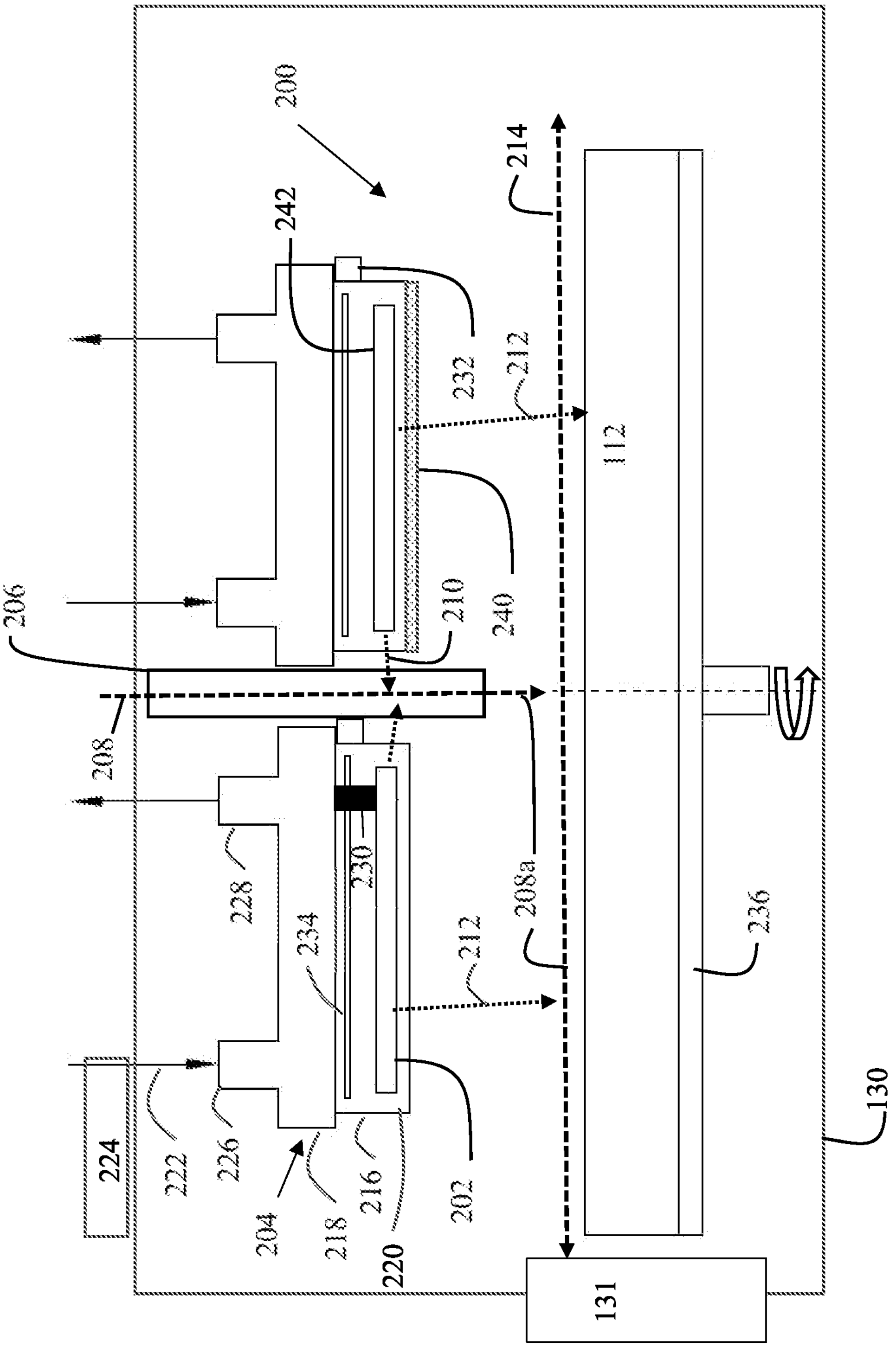
FIG. 2 depicts a schematic view of a cleaning apparatus in a cleaning chamber of the multi-chamber processing tool depicted in FIG. 1.

FIG. 2 is a schematic view of a cleaning apparatus 200 housed in a cleaning chamber 130, also referred to herein as a wet cleaning chamber, of the multi-chamber processing tool 100 of FIG. 1. In some embodiments, the cleaning chamber 130 may form part of the cleaning apparatus 200. In FIG. 2, the cleaning apparatus 200 is shown being used to clean the substrate 112. Although described in connection with a particular cleaning chamber 130 in the multi-chamber processing tool 100 shown above, the cleaning apparatus 200 may be housed in cleaning chambers having other configurations than can be in processing tools having other configurations, including use as a standalone tool without coupling to a multi-chamber processing tool.

The cleaning apparatus 200 for cleaning a substrate includes a UV lamp 202 disposed within a UV lamp assembly 204. The cleaning apparatus 200 further includes a water inlet for receiving a supply of ozonated water 208 and a water outlet 206 e.g., a nozzle, disposed above the substrate 112 on the substrate support 236 for discharging ozonated water 208 irradiated by the UV lamp assembly 204 into contact with the substrate 112 disposed on the substrate support 236.

In embodiments, the UV electromagnetic radiation 212 emitted by the UV lamp assembly 204 contacts the ozonated water 208 and the substrate 112 within the cleaning chamber. An inlet for ozonated water through which the ozonated water 208 flows from an external source and then in contact with the UV electromagnetic radiation 210 along a flowpath 214 over at least a portion of the substrate in contact with the substrate 112. In embodiments, the UV lamp 202 is configured to emit ultraviolet radiation which contacts both the substrate 112 and the ozonated water 208.

In embodiments, the UV lamp 202 may be a low-pressure mercury ultraviolet lamp. In the embodiment shown in FIG. 2, the UV lamp assembly 204 houses the UV lamp 202. In the embodiment shown in FIG. 2, the UV lamp assembly 204 defines a cooling chamber 216 surrounding the UV lamp 202. In the embodiment shown in FIG. 2, the UV lamp assembly 204 may include an upper cover 218 and a lower cover 220 sealingly engaged together. The upper cover 218 may be formed from polytetrafluoroethylene (PTFE) and the lower cover 220 may be formed from quartz that permits the transmission of UV electromagnetic radiation 212 emitted by the UV lamp 202. The UV lamp may be disposed in thermal communication with a controlled flow of a cooling fluid 222, e.g., via flow controller 224, wherein the flow of the cooling fluid 222 is controlled to control a temperature of the UV lamp 202. The UV lamp assembly 204 may have a cooling fluid inlet 226 separated from a cooling fluid outlet 228 along a flowpath in which the cooling fluid 222 is in physical contact with the UV lamp 202. The cooling fluid inlet 226 and the cooling fluid outlet 228 may be formed in the upper cover 218 as shown in the embodiment of FIG. 2. The cooling fluid inlet 226 may be fluidly coupled to a supply of cooling fluid 222, such as cool dry air. The cooling fluid outlet 228 may be fluidly coupled to a cooling fluid exhaust. The cooling fluid inlet 226 and the cooling fluid outlet 228 are in fluid communication with the cooling chamber 216, which is configured to route the cooling fluid between the cooling fluid inlet 226 and the cooling fluid outlet 228 and over the UV lamp 202. The flow of cooling fluid over the UV lamp 202 cools the UV lamp 202 to control the temperature of the UV lamp 202.

In embodiments, the UV lamp assembly 204 further includes a thermocouple 230, or other similar device configured to determine the temperature of the UV lamp 202. In other embodiments, the UV lamp 202 may be configured with a thermocouple or other similar device (not shown) to determine the temperature of the UV lamp 202.

As discussed in more detail below, the temperature of the UV lamp 202 can be controlled by controlling the flow of cooling fluid 222 to affect the peak amplitude of the emission spectrum emitted by the UV lamp 202. For example, a lower temperature may decrease the peak amplitude while a higher UV lamp temperature may result in a bathochromic shift of the emitted UV electromagnetic radiation (UV light) to a longer wavelength UV light. In embodiments, the cleaning apparatus 200 may include an UV detector 232 configured to measure at least a portion of the UV spectrum emitted by the UV lamp assembly 204, e.g., to monitor the peak amplitude of the emission spectrum of the UV lamp 202, which can be used as feedback to regulate the temperature of the UV lamp 202, i.e., by adjusting the parameters of the cooling fluid passing through the cooling chamber 216, such as cooling fluid flow rate and inlet temperature of the cooling fluid. The UV detector 232 may be connected to the UV lamp assembly 204 as shown in FIG. 2, or may be located elsewhere so long as the UV detector 232 is capable of measuring e.g., sensing at least a portion of the UV spectrum of the UV light emitted by the UV lamp assembly 204 such that the UV detector 232 and a UV lamp 202 are in thermal communication with a controlled flow e.g., via flow controller 224 of a cooling fluid 222; configured such that, in operation, the flow of the cooling fluid 222 is controlled based at least in part on a response of the UV detector 232.

The cleaning apparatus 200 may further include an upper reflector 234, which may be disposed within the cooling chamber 216 of the UV lamp assembly 204, as shown in FIG. 2. The upper reflector 234 extends along and above the UV lamp 202. The upper reflector 234 may be formed of aluminum or an aluminum alloy or any other suitable material that can reflect ultraviolet radiation.

The cleaning apparatus 200 may also include a substrate support 236 located below the UV lamp assembly 204. The substrate support 236 may be rotatably connected to the cleaning chamber 130. The substrate support 236 may be configured to rotate about a central axis as shown in FIG. 2, wherein the substrate 112 is irradiated with UV electromagnetic radiation 212 and with UV irradiated ozonated water 208*a* flowing onto the substrate 112.

The cleaning chamber 130 may have a slit valve door 131 that is operable to open and close to permit the substrate 112 to be introduced or removed from the interior of the cleaning chamber 130, such as by transfer robot 116 (FIG. 1).

In embodiments, the UV lamp 202 may be a low-pressure mercury UV lamp configured to operate at about 30 to 150 watts and emit ultraviolet radiation having a spectrum defined by a peak amplitude at a wavelength between 240 nanometers and 310 nanometers at a design operational temperature. In some embodiments, the lamp emits ultraviolet radiation having main ultraviolet emission at about 254 nanometers. In embodiments, the UV lamp 202 is configured such that when a temperature of the UV lamp is within a first temperature range, which may be a design temperature range intended to be the temperature range specified by the manufacturer, greater than or equal to about 50% of the UV electromagnetic radiation emitted by the UV lamp is less than or equal to 270 nm, e.g., ~254 nm, and when the temperature of the UV lamp is within an operational temperature range, suitable for use according to embodiments disclosed herein, greater than or equal to about 50% of the UV electromagnetic radiation emitted by the UV lamp is greater than or equal to 280 nm, wherein a lower limit of the operational temperature range is greater than an upper limit of the first temperature range.

Low-pressure mercury ultraviolet lamps may be characterized as those which emit electromagnetic radiation in the UV-C region having a peak or maximum intensity of UV light at a wavelength from about 200 nm to 280 nm, with most low-pressure mercury UV lamps emitting electromagnetic radiation having a peak or maximum intensity of UV light at a wavelength from about 253 nm to 255 nm, e.g., 254 nm.

However, the inventors have discovered that by controlling the temperatures of the UV lamp, often times at temperatures above those utilized to produce UV-C electromagnetic radiation, these lamps are also capable of emitting UV electromagnetic radiation in the UV-B region having a peak or maximum intensity of UV light at a wavelength from about 280 nm to 320 nm, with a maximum intensity centered at ~300 nm or ~315 nm, or in the UV-A region having a peak or maximum intensity of UV light at a wavelength from about 320 nm to 400 nm, with a maximum intensity centered at ~365 nm to 370 nm.

The inventors have also discovered that the reaction or interaction of the ozonated water with the UV light increases the reaction rate at which contaminants on the substrate are removed, with the lower wavelength light, and thus the ozonated water irradiated with the higher energy UV electromagnetic energy being more reactive. However, in addition to removing organic contaminants from the substrate, e.g., from a photoresist or other processes, the ozonated water/UV irradiation at UV-C wavelengths also removes chromium or other metals which have been specifically disposed on the surface of the substrate as part of the intended final product.

The inventors have observed that the organic contaminants may be adequately removed from the substrate with a greatly reduced rate of removal or destruction of chromium or other metals present by increasing the wavelength of the UV light i.e., reducing the energy of the UV light. Accordingly, in embodiments the cleaning apparatus for cleaning a substrate is configured such that during operation, greater than or equal to about 50% of the UV electromagnetic radiation has a wavelength of greater than or equal to about 280 nm. In the embodiment shown in FIG. 2, the UV lamp 202 is disposed in thermal communication with a controlled flow of the cooling fluid 222, and the flow of the cooling fluid 222 is controlled (224) such that greater than or equal to about 50% of the UV electromagnetic radiation 212 emitted by the UV lamp 202 has a wavelength of greater than or equal to about 280 nm.

In embodiments, the cleaning chamber 130 further comprises a thermocouple 230 configured to determine a temperature of the UV lamp 202; and the flow of the cooling fluid 222 is controlled based at least in part on a temperature of the UV lamp 202. In other embodiments, the cleaning chamber further comprises a UV detector, 232, and the cleaning chamber apparatus is configured to control the flow of the cooling fluid 222 based at least in part on a signal produced by the UV detector 232. In some embodiments, the cleaning chamber may include both the thermocouple and the UV detector.

In some embodiments, the cooling fluid 222 is in physical contact with at least a portion of the UV lamp 202 as shown in FIG. 2. However, the UV lamp may be in thermal contact with the cooling fluid without being in direct physical contact with the cooling fluid.

In embodiments the UV lamp is configured such that when a temperature of the UV lamp is within a first temperature range, greater than or equal to about 50% of the UV electromagnetic radiation emitted by the UV lamp is less than or equal to 270 nm; and when the temperature of the UV lamp is within an operational temperature range, greater than or equal to about 50% of the UV electromagnetic radiation emitted by the UV lamp is greater than or equal to 280 nm; wherein a lower limit of the operational temperature range is greater than an upper limit of the first temperature range.

In some embodiments the cleaning apparatus 200 for cleaning a substrate 112 comprises an optical filter 240 configured to produce a bathochromic shift in a wavelength of UV electromagnetic radiation, configured to remove UV electromagnetic radiation having a wavelength below 280 nm; or a combination thereof.

In embodiments, the UV lamp 202 comprises a coating 242 configured to produce a bathochromic shift in a wavelength of UV electromagnetic radiation.

Examples of suitable coatings include phosphor.

In some embodiments, the UV lamp assembly 204 is configured such that during operation, greater than or equal to about 50% of the UV electromagnetic radiation has a wavelength from greater than or equal to about 310 nm and less than or equal to about 370 nm. In other embodiments, greater than or equal to about 50% of the UV electromagnetic has a wavelength greater than or equal to about 310 nm and less than or equal to about 320 nm. In other embodiments, greater than or equal to about 50% of the UV electromagnetic radiation has a wavelength greater than or equal to about 365 nm and less than or equal to about 375 nm.

Figure 3:
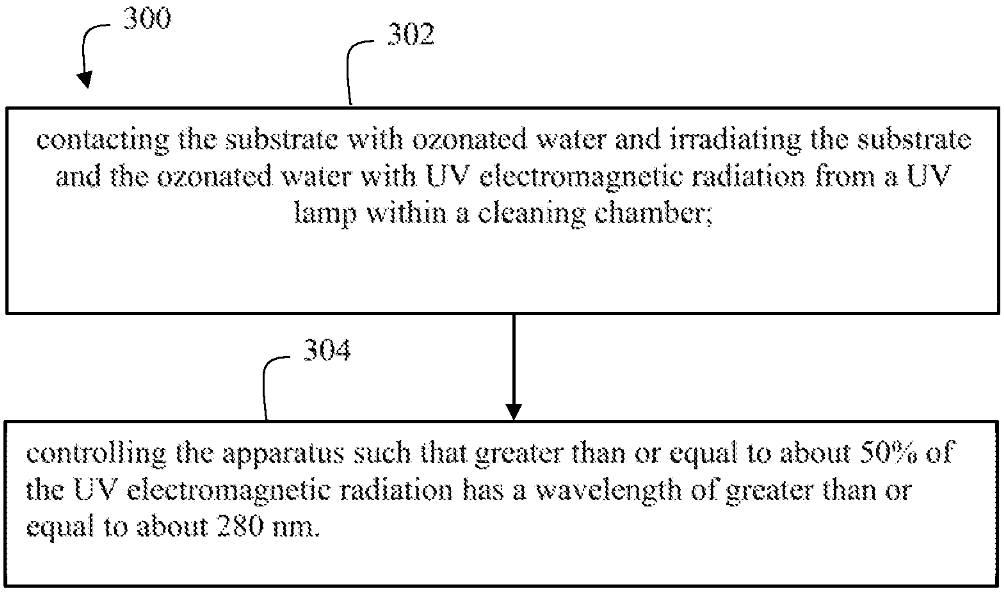
FIG. 3 depicts a cleaning workflow employing the cleaning apparatus depicted in FIG. 2 in accordance with at least some embodiments of the present disclosure.

FIG. 3 depicts a method 300 of cleaning a substrate 112, comprising contacting the substrate 112 with ozonated water 208 and irradiating the substrate and the ozonated water, which may include UV irradiated ozonated water 208*a* with UV electromagnetic radiation 212 from a UV lamp 202, e.g., a low-pressure mercury UV lamp within a cleaning chamber (block 302), wherein the apparatus is controlled such that greater than or equal to about 50% of the UV electromagnetic radiation has a wavelength of greater than or equal to about 280 nm (block 304).

In some embodiments, the controlling at block 304 comprises controlling a flow of cooling fluid in thermal communication with the UV lamp, wherein the cooling chamber comprises a thermocouple configured to determine a temperature of the UV lamp; and a UV detector, and the flow of cooling fluid is controlled such that greater than or equal to about 50% of the UV electromagnetic radiation has a wavelength of greater than or equal to about 280 nm, based at least in part on a temperature of the low-pressure mercury UV lamp, a signal produced by the UV detector, or both.

Embodiments

Accordingly, the present disclosure includes the following embodiments, among others as recited in the appended claims.

E1. A method of cleaning a substrate, comprising:

contacting the substrate with ozonated water and irradiating the substrate and the ozonated water with UV electromagnetic radiation from a UV lamp within a cleaning chamber;

wherein greater than or equal to about 50% of the UV electromagnetic radiation has a wavelength of greater than or equal to about 280 nm.

E2. The method according to embodiment E1, wherein at least a portion of the ozonated water is irradiated with the UV electromagnetic radiation prior to the ozonated water contacting the substrate.

E3. The method according to embodiment E1 or E2, wherein the UV lamp is disposed in thermal communication with a controlled flow of a cooling fluid, and wherein the method further comprises controlling a flow of the cooling fluid such that greater than or equal to about 50% of the UV electromagnetic radiation emitted by the UV lamp has a wavelength of greater than or equal to about 280 nm.

E4. The method according to embodiments E1 through E3, wherein the cleaning chamber further comprises a thermocouple configured to determine a temperature of the UV lamp; and wherein the method further comprises controlling the flow of the cooling fluid based at least in part on a temperature of the UV lamp.

E5. The method according to embodiments E1 through E4, wherein the cleaning chamber further comprises a UV detector, and wherein the method further comprises controlling the flow of the cooling fluid based at least in part on a signal produced by the UV detector.

E6. The method according to embodiments E1 through E5, wherein the cooling fluid is in physical contact with at least a portion of the UV lamp.

E7. The method according to embodiments E1 through E6, wherein the UV lamp is configured such that when a temperature of the UV lamp is within a first temperature range, greater than or equal to about 50% of the UV electromagnetic radiation emitted by the UV lamp is less than or equal to 270 nm; and when the temperature of the UV lamp is within an operational temperature range, greater than or equal to about 50% of the UV electromagnetic radiation emitted by the UV lamp is greater than or equal to 280 nm;

wherein a lower limit of the operational temperature range is greater than an upper limit of the first temperature range.

E8. The method according to embodiments E1 through E7, wherein the UV lamp comprises a coating configured to produce a bathochromic shift in a wavelength of UV electromagnetic radiation.

E9. The method according to embodiments E1 through E8, wherein greater than or equal to about 50% of the UV electromagnetic radiation has a wavelength from greater than or equal to about 310 nm and less than or equal to about 370 nm.

E10. The method according to embodiments E1 through E9, wherein greater than or equal to about 50% of the UV electromagnetic has a wavelength greater than or equal to about 310 nm and less than or equal to about 320 nm.

E11. The method according to embodiments E1 through E10, wherein greater than or equal to about 50% of the UV electromagnetic radiation has a wavelength greater than or equal to about 365 nm and less than or equal to about 375 nm.

E12. A method of cleaning a substrate according to embodiments E1 through E11, comprising:

contacting the substrate with ozonated water and irradiating the substrate and the ozonated water with UV electromagnetic radiation from a low-pressure mercury UV lamp within a cleaning chamber;

the cleaning chamber further comprising a thermocouple configured to determine a temperature of the UV lamp; and a UV detector, and the UV lamp being disposed in thermal communication with a controlled flow of a cooling fluid;

wherein the flow of the cooling fluid is controlled such that greater than or equal to about 50% of the UV electromagnetic radiation has a wavelength of greater than or equal to about 280 nm, based at least in part on a temperature of the low-pressure mercury UV lamp, and a signal produced by the UV detector.

E13. A method of cleaning a substrate comprising:

contacting the substrate with ozonated water and irradiating the substrate and the ozonated water with UV electromagnetic radiation from a low-pressure mercury UV lamp within a cleaning chamber;

the cleaning chamber further comprising a thermocouple configured to determine a temperature of the UV lamp; and a UV detector, and the UV lamp being disposed in thermal communication with a controlled flow of a cooling fluid;

wherein the flow of the cooling fluid is controlled such that greater than or equal to about 50% of the UV electromagnetic radiation has a wavelength of greater than or equal to about 280 nm, based at least in part on a temperature of the low-pressure mercury UV lamp, and a signal produced by the UV detector.

E14 A cleaning apparatus for cleaning a substrate according to embodiments E1 through E13, comprising:

a UV lamp assembly comprising a UV lamp, disposed over a substrate support disposed within a cleaning chamber, wherein the UV lamp assembly is configured such that, in operation, greater than or equal to about 50% of the UV electromagnetic radiation emitted by the UV lamp assembly has a wavelength of greater than or equal to about 280 nm;

a water inlet for receiving a supply of ozonated water and a water outlet disposed above the substrate support for discharging ozonated water irradiated by the UV lamp assembly into contact with the substrate disposed on the substrate support;

wherein UV electromagnetic radiation emitted by the UV lamp assembly contacts the ozonated water and the substrate within the cleaning chamber.

E15. The cleaning apparatus for cleaning a substrate according to embodiment E14, comprising a coating disposed on the UV lamp, configured to produce a bathochromic shift in a wavelength of UV electromagnetic radiation, configured to remove UV electromagnetic radiation having a wavelength below 280 nm; or a combination thereof.

E16. The cleaning apparatus for cleaning a substrate according to embodiments E14 through E15, comprising an optical filter configured to produce a bathochromic shift in a wavelength of UV electromagnetic radiation, configured to remove UV electromagnetic radiation having a wavelength below 280 nm; or a combination thereof.

E17. The cleaning apparatus for cleaning a substrate according to embodiments E14 through E16, comprising a UV detector and a UV lamp in thermal communication with a controlled flow of a cooling fluid; configured such that, in operation, the flow of the cooling fluid is controlled based at least in part on a response of the UV detector.

E18. The cleaning apparatus for cleaning a substrate according to embodiments E14 through E17, comprising a thermocouple configured to determine a temperature of the UV lamp; configured such that, in operation, the flow of the cooling fluid is controlled based at least in part on a response of the UV detector.

E19. The cleaning apparatus for cleaning a substrate according to embodiments E14 through E18, wherein the UV lamp is a low-pressure mercury UV lamp.

E20. The cleaning apparatus for cleaning a substrate according to embodiments E14 through E19, configured such that, in operation greater than or equal to about 50% of the UV electromagnetic radiation emitted by the UV lamp assembly has a wavelength greater than or equal to about 310 nm and less than or equal to about 320 nm.

E21. The cleaning apparatus for cleaning a substrate according to embodiments E14 through E19, configured such that, in operation greater than or equal to about 50% of the UV electromagnetic radiation emitted by the UV lamp assembly has a wavelength greater than or equal to about 365 nm and less than or equal to about 375 nm.

While the foregoing is directed to embodiments of the present disclosure, other and further embodiments of the disclosure may be devised without departing from the basic scope thereof.

We claim:

1. A cleaning apparatus for cleaning a substrate, comprising:

a UV lamp assembly comprising a UV lamp, disposed over a substrate support disposed within a cleaning chamber, and a water inlet for receiving a supply of ozonated water and a water outlet disposed above the substrate support for discharging ozonated water irradiated by the UV lamp assembly into contact with the substrate when disposed on the substrate support;

wherein the UV lamp assembly is configured such that, in operation, UV electromagnetic radiation emitted by the UV lamp assembly contacts the ozonated water and the substrate within the cleaning chamber;

wherein the UV lamp is in thermal communication with a cooling fluid;

wherein the cleaning apparatus further comprises at least one of a sensor configured to determine a temperature of the UV lamp and/or a UV detector;

wherein a flow of the cooling fluid is controlled based at least in part on the temperature of the UV lamp and/or a signal from the UV detector, such that, in operation, greater than or equal to about 50% of UV electromagnetic radiation emitted by the UV lamp assembly has a wavelength of greater than or equal to about 280 nm, wherein the cleaning apparatus comprises the UV detector; and wherein the flow of the cooling fluid is controlled based at least in part on the signal from the UV detector.

2. The cleaning apparatus for cleaning a substrate of claim 1, comprising a coating disposed on the UV lamp, configured to produce a bathochromic shift in a wavelength of UV electromagnetic radiation, and configured to remove UV electromagnetic radiation having a wavelength below 280 nm.

3. The cleaning apparatus for cleaning a substrate of claim 1, comprising an optical filter configured to produce a bathochromic shift in a wavelength of UV electromagnetic radiation, and configured to remove UV electromagnetic radiation having a wavelength below 280 nm.

4. The cleaning apparatus for cleaning a substrate of claim 1, wherein the cleaning apparatus comprises the sensor configured to determine a temperature of the UV lamp; wherein the flow of the cooling fluid is controlled based at least in part on the temperature of the UV lamp.

5. The cleaning apparatus for cleaning a substrate of claim 1, wherein the UV lamp is a mercury UV lamp.

6. The cleaning apparatus for cleaning a substrate of claim 1, configured such that, in operation greater than or equal to about 50% of the UV electromagnetic radiation emitted by the UV lamp assembly has a wavelength greater than or equal to about 310 nm and less than or equal to about 320 nm.

7. The cleaning apparatus for cleaning a substrate of claim 1, configured such that, in operation greater than or equal to about 50% of the UV electromagnetic radiation emitted by the UV lamp assembly has a wavelength greater than or equal to about 365 nm and less than or equal to about 375 nm.

8. The cleaning apparatus for cleaning a substrate of claim 1, wherein the sensor configured to determine a temperature of the UV lamp is a thermocouple.

* * * * *